Figure 1:
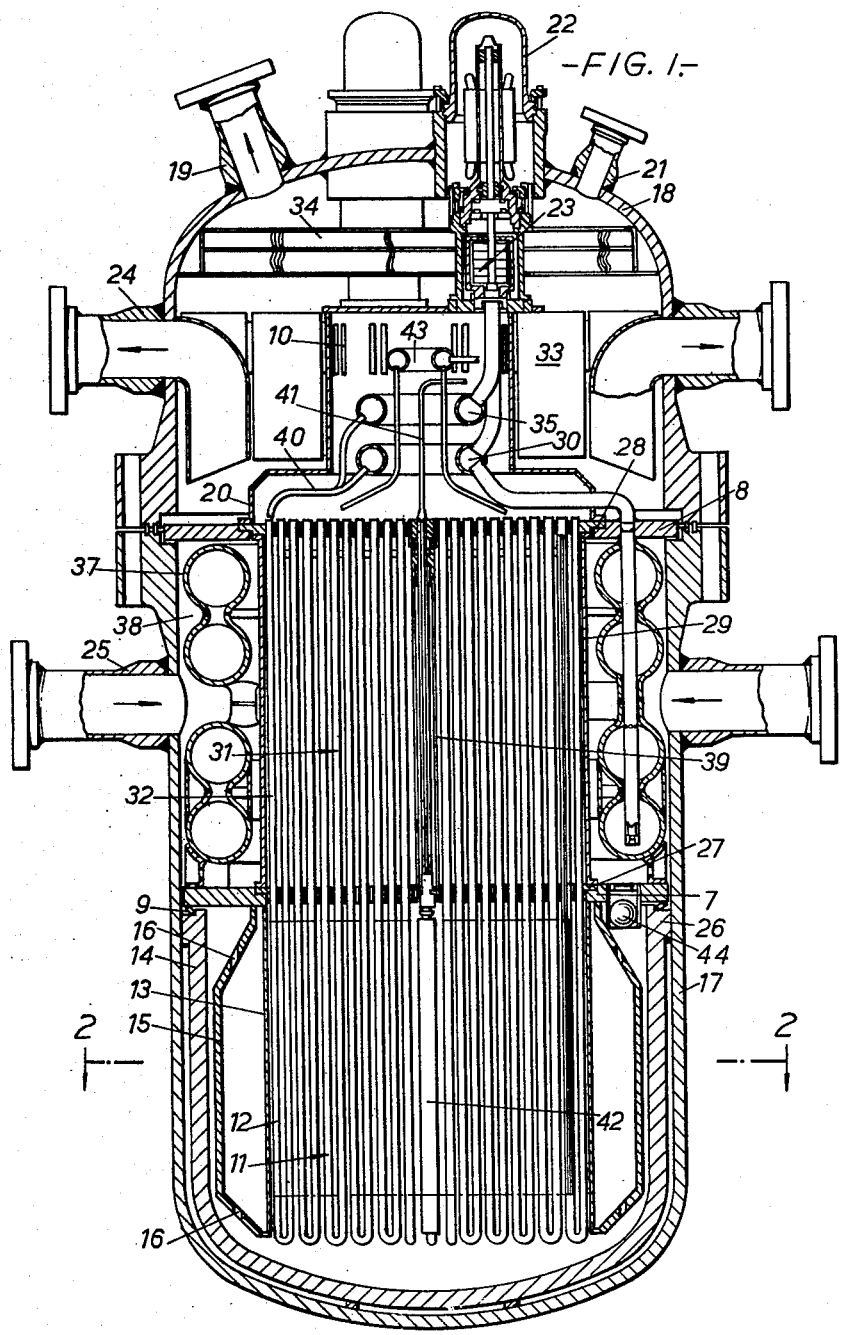

March 30, 1965

R. POTTER 3,175,954

NUCLEAR REACTOR CORE STRUCTURE

Filed Nov. 19, 1962

3 Sheets-Sheet 1

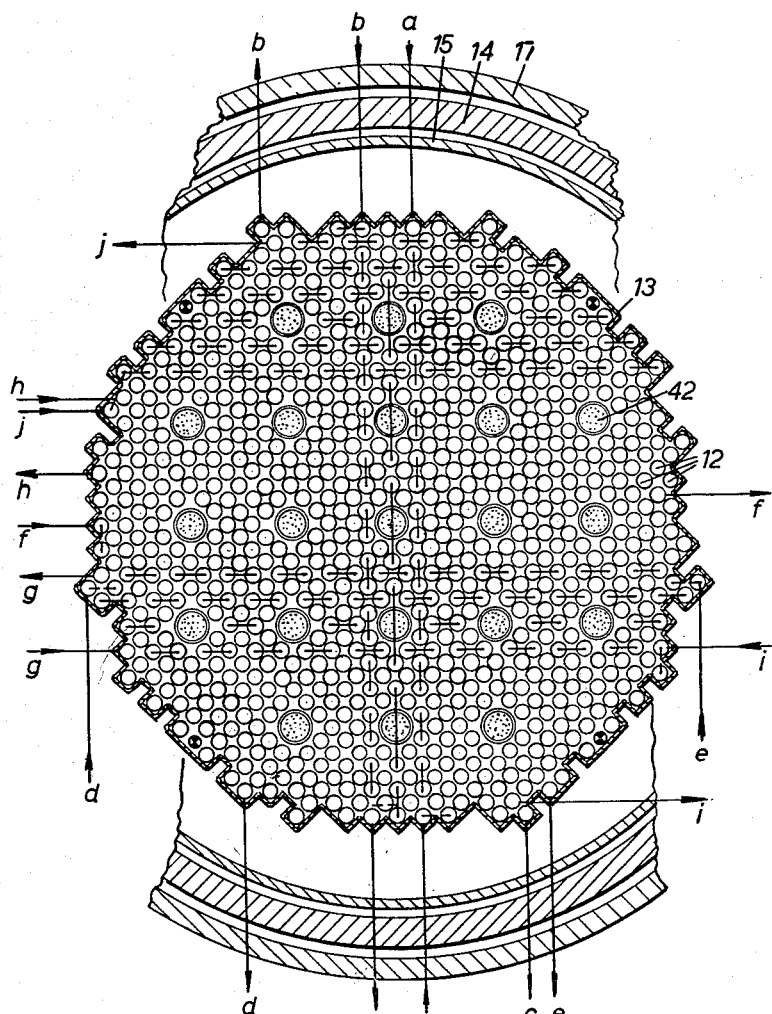
-FIG.2-

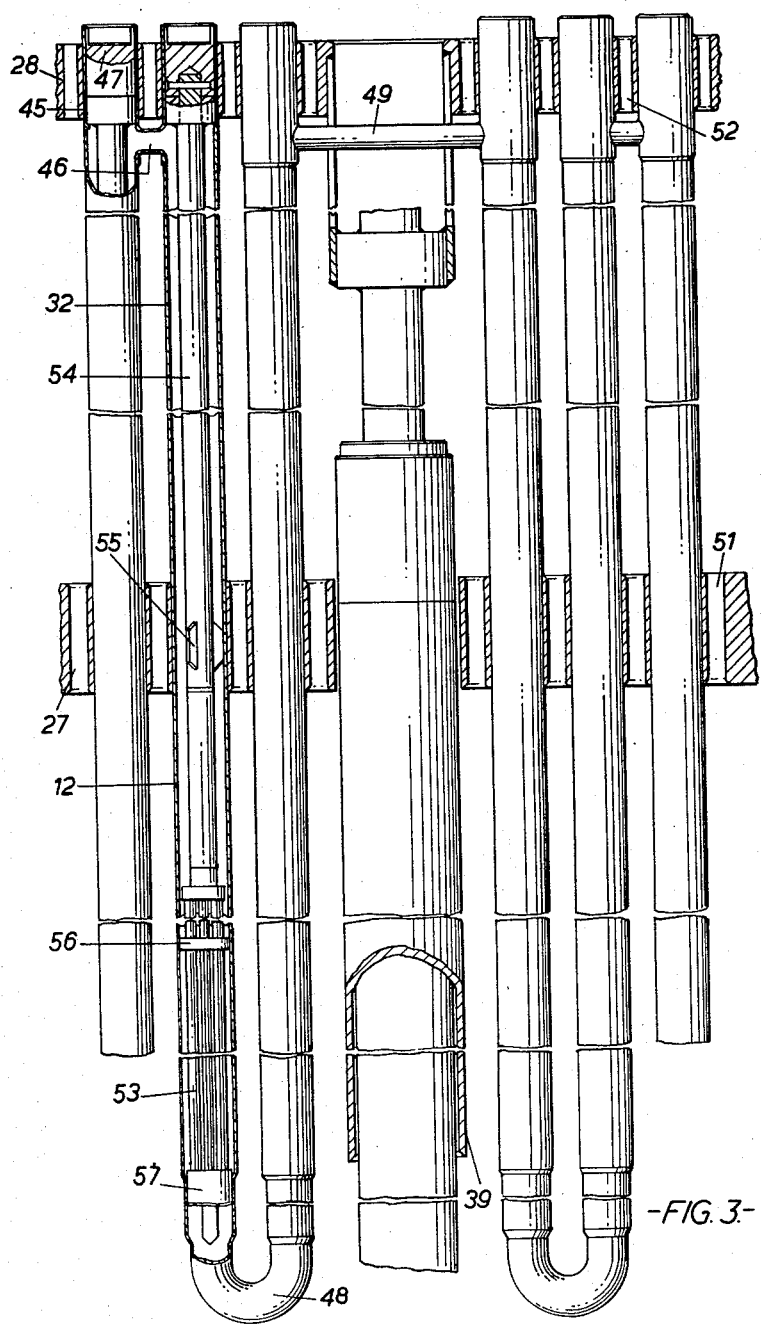

United States Patent Office 3,175,954
Patented Mar. 30, 1965

3,175,954
NUCLEAR REACTOR CORE STRUCTURE
Ronald Potter, Broadstone, near Poole, Dorset, England, assignor to United Kingdom Atomic Energy Authority, London, England
Filed Nov. 19, 1962, Ser. No. 238,446
Claims priority, application Great Britain, July 5, 1962, 25,786/62
1 Claim. (Cl. 176—61)

This invention relates to nuclear reactors and particularly to those reactors in which fuel elements constituting the reactor core are housed in fuel tubes and a primary reactor coolant is passed through the fuel tubes to abstract heat from the fuel elements.

It is known that more heat is usually generated at the centre of the core of nuclear reactor than at the core periphery, owing to the greater nuetron flux at the core centre. It is advantageous, however, to abstract heat from a core in such a way that the heat abstracted from the core centre is not greatly different from the heat abstracted from the core periphery. Accordingly it is an object of the present invention to provide a nuclear reactor of the kind described in which excess heat generated in a locality of the core with respect to the average heat generated by the core is dissipated over the whole core area.

Accordingly, the present invention provides a nuclear reactor comprising fuel elements, fuel tubes housing the fuel elements, a primary reactor coolant within the fuel tubes, and connections between the fuel tubes to provide for the primary coolant a plurality of primary coolant flowpaths, the flowpaths being arranged to traverse the reactor core in mutually intersecting directions to form a matrix of flowpaths by which excess heat generated at a locality in the core is dissipated over the whole core area.

The present invention has a particularly application to a nuclear reactor in which the primary coolant is employed as an intermediate heat transfer medium between the fuel elements and a secondary reactor coolant passing through the core.

In this application the invention provides a nuclear reactor comprising fuel elements, fuel tubes housing the fuel elements, a primary coolant within the fuel tubes, a secondary coolant for passage outside the fuel tubes in heat transfer through the tubes with the primary coolant therein, and connections between the fuel tubes to provide for the primary coolant a plurality of separate flowpaths for series flow of the primary coolant through the fuel tubes, the flowpaths being arranged to traverse the reactor core in intersecting directions to form a matrix of flowpaths whereby excess heat generated at a locality in the core is dissipated over the whole core area. Preferably the flowpaths are arranged to link approximately equal numbers of fuel tubes and are arranged in groups of flowpaths which traverse the core in mutually perpendicular directions.

One embodiment of the invention will now be described by way of example with reference to the accompanying drawings in which:

FIGURE 1 shows a vertical section through a boiling water reactor embodying the invention, FIGURE 2 shows a diagrammatic section on line 2—2 of FIGURE 1, and FIGURE 3 shows an enlarged view of the reactor tube assembly.

*General assembly*

The boiling water reactor now to be described by way of example has a core 11 (FIGURES 1 and 2) in which fuel elements are housed in fuel tubes 12 through which pressurized light water is circulated as a primary coolant. The fuel tubes are clustered in a manner to be described hereinafter in a core region defined by a baffle 13, this assembly being housed in a pot 14. A secondary coolant, also light water, is circulated downwards through the annular space between the pot and the baffle and upwardly through the core between the fuel tubes. A thermal shield 15, interposed between the baffle and the pot, has apertures 16 to permit downward flow of the secondary coolant. Neutron moderation in the reactor is effected by the primary and secondary coolants.

The reactor is housed in a reactor vessel 17 closed by a dome 18 from which projects a steam pipe 19, three connections 21 for pressure relief valves, and three casings 22 (of which only one is shown in FIGURE 1) each housing a motor-driven pump 23 for circulating the primary coolant. Also projecting laterally of the dome are two outlets 24 for recirculating unevaporated secondary coolant, whilst projecting laterally of the vessel 17 are two inlets 25 for the recirculating secondary coolant. The pot sits within the lower half of the reactor vessel being located by a rim 26 surrounding the pot. An intermediate support annulus 7 is supported by the rim 26 and carries an intermediate support plate 27, whilst a top support annulus 8 rests on a shoulder formed at the upper end of the vessel and carries a ton support plate 28. The intermediate support annulus and plate form a transverse partition which seals the pot 14, a sealing ring 9 being provided for this purpose. Between the support plates a skirt 29 defines a cylindrical heat transfer region 31 within which are clustered extension tubes 32, each extension tube being a continuation of a fuel tube. The upper ends of the extension tubes and the lower ends of the fuel tubes have interconnections to form parallel paths of serpentine configuration for the primary coolant through series of tubes. The fuel tubes and the extension tubes are suspended from the top support plate and are steadied against vibration and deformation by the intermediate support plate.

Apertures in the support plates permit upward flow of the secondary coolant through the core and the heat transfer region into the dome. In its upward passage the secondary coolant is allowed to boil to form a mixture of steam and water which is separated in the dome by fifteen cyclone steam separators 33 which discharge water to the outlets 24 and steam to scrubber units 34 and thence to the steam outlet. A division plate 20, in section similar to a top hat, covers the heat transfer region and funnels the secondary coolant through apertures 10 to the steam separators; the primary circulating pumps are mounted on the division plate.

The primary coolant is collected from and introduced into the paths through the fuel and extension tubes by ring headers 30, 35. The pumps 23 circulate the primary coolant from the upper outlet header 35 to the lower inlet header 30 and thence back to the fuel and extension tubes. A toroidal pressuriser 37 in communication with the lower header serves to maintain the pressure of the primary coolant and is situated within the annular space 38 between the skirt and the reactor vessel.

Hollow open-ended control rods 39 of neutron absorbing material are housed within the heat transfer region during normal operation of the reactor and drop into the core over guide tubes 42 when it is desired to shut the reactor down. The control rods are hydraulically operated, there being an individual connection 41 between each of nine central control rods and control apparatus outside the reactor by which these central control rods can be actuated singly or in groups. There are also connections 40 between other outer control rods and an operating fluid header 43 within the division plate, and a single connection between this header and the control apparatus, so that the outer control rods are actuated in unison.

The recirculated water of the secondary coolant, together with feed water as necessary, is returned to the reactor vessel by the inlets 25 which open into the annular space 38 above the intermediate support annulus. Mounted in the intermediate support annulus are twenty-four non-return valves 44 through which the secondary coolant must pass to enter the core pot. These valves have an important safety function.

It is desirable that a reactor fails safe in the event of any conceivable accident. Accordingly care must be taken to ensure that damage to the secondary coolant circuit could not result in the reactor vessel being drained of secondary coolant leaving the fuel tubes dry externally with the risk of overheating. Should a rupture of the dome occur, the secondary coolant is depressurised and consequently much of this coolant is evaporated; however, it can be shown that sufficient coolant water remains in the core pot to maintain immersion of the greater part of the fuel tubes. On the other hand, should a rupture occur at the inlets 25 it is conceivable that, in the absence of the valves 44, the pressure of steam in the dome could force all the secondary coolant water in the core pot out through the rupture, leaving the fuel tubes dry externally. This possibility is forestalled by the non-return valves 44 which prevent secondary coolant being forced back from the core pot and expelled through the breach.

Assembly of fuel tubes and extension tubes

Each fuel tube 12 and its associated extension tube 32 (FIGURE 3) is constituted by an integral length of tubing made from a material of low capture cross section for neutrons, for example a zirconium base alloy such as zirconium with 2½% by weight of niobium; this particular alloy has low neutron capture cross section combined with mechanical strength and corrosion resistance in boiling water. The tubes have an internal diameter of 1.359 inches and are arranged in a square lattice with their centres 1.529 inches apart. This lattice spacing is maintained by the intermediate support plate 27 in which the tubes are slidable and by the top support plate 28 from which the tubes are suspended. To the upper end of each extension tube there is fitted a tubular head 45, the two heads of adjacent tubes having branch interconnections 46. End caps 47 seal the upper ends of the heads and the heads are jointed into the top support plate for example by sweating or cold pressing; the end caps are of a zirconium base alloy preferably the same as is used for the tubes 12 and 32. At their lower ends the fuel tubes are reduced in diameter and joints between adjacent fuel tubes are made by U bend interconnections 48. Positioned on parallel axes at intervals throughout the tube assembly are the control rods 39 also suspended from the top support plate; at these positions longer branches 49 interconnect the heads of adjacent extension tubes. The fuel and extension tubes are so interconnected as to provide separate, isolated, serpentine paths for the primary coolant passing through the tube assembly. Apertures 51, 52 in the intermediate and top support plates 27, 28 permit circulation of the secondary coolant upwardly between the fuel and extension tubes whilst also creating some degree of pumping head to suit the characteristics of the secondary coolant circulating means. Within each fuel tube is situated a fuel assembly 53 carried by a stainless steel stem 54 which extends upwardly through the extension tube and is secured at its upper end to the end cap. The rod 54 carries a spider 55 having radial projections to centralise the fuel assembly in the fuel tube. The fuel assembly is also centralised by webs 56 and at its lower end by a fitting 57.

The function of the primary coolant, which is pressurised light water, is to abstract heat from the fuel assemblies and deliver it to the secondary coolant, which is boiling light water. The provision of the extension tubes 32 to constitute an unfuelled heat transfer region directly above the core enables the primary coolant circulated within them to dissipate heat between consecutive back and forth passes through the core. Thus, in its passage through the fuel tubes the primary coolant can abstract more heat from the fuel than it delivers to the secondary coolant, the gain being transferred subsequently to the same secondary coolant, through the extension tubes, before the primary coolant next passes throught the core.

As stated above the fuel and extension tubes are connected to provide parallel serpentine paths for the primary coolant flowing through the tubes. There are ten paths which are indicated diagrammatically in FIGURE 2 by arrows $a$ to $i$. Each path has an inlet from the lower ring header and an outlet to the upper ring header (FIGURE 1). Each path is constituted by a series of passes back and forth across the core within a certain transverse band. The ten paths are arranged in groups of five, the transverse bands swept by one group of paths being parallel to each other and perpendicular to the transverse bands swept by the other group of paths. Thus, as viewed in FIGURE 3, paths $a$, $b$, $c$, $d$, and $e$ sweep vertical bands across the core whereas paths $f$, $g$, $h$, $i$, and $j$ sweep horizontal bands. For the sake of clarity only the passes of paths $a$, $g$ and $j$ are shown in full; for the remaining paths only the inlets and outlets are shown.

Considering the paths in greater detail it is seen that the path $a$ is constituted by three passes across the core in a narrow central transverse band (which is vertical as seen in the FIGURE 3). This path $a$ links 60 fuel tubes of which 59 are charged with fuel; the additional uncharged fuel tube is provided so that there are an even number of tubes linked by the path, this allowing inlet and outlet connections to the path to be made at the heads of the extension tubes. The path $g$ is constituted by four passes across the core in an intermediate transverse band (which is horizontal as seen in FIGURE 3). The band covered by the path $g$ is broader than the band covered by the path $a$ so that, although the band does not cross the core diametrically, the number of fuel tubes, 80, linked by the path $g$ is not less than the number linked by the path $a$ covering the central diametrical band; of the fuel tubes linked by the path $g$, 79 are charged with fuel. The path $j$ covers a broader outer transverse band (which is horizontal as seen in FIGURE 3), the path being constituted by six passes across the core which link 94 fuel tubes of which 93 are charged with fuel. So that the inlet connection could be made to the head of an extension tube, the inlet to the path $j$ is made to a tube which is displaced from the first pass of the path across the core; the displaced tube is linked with the first tube of the first pass by a bottom U-bend connection (indicated diagrammatically by a broken line).

Of the remaining paths, which are not shown in full, path $b$, is constituted by four passes across the core linking 84 fuel tubes of which 83 are charged with fuel and corresponds to path $g$ in that it covers an intermediate core band; path $b$ has a displaced inlet tube as described with reference to path $j$. Path $c$ corresponds to path $b$ in that it is constituted by four passes across an intermediate core band linking 84 fuel tubes and has a displaced inlet tube. Path $d$ is constituted by six passes across an outer core band and thus corresponds to path $j$; path $d$ has a displaced inlet tube and links 82 fuel tubes of which 81 tubes are charged with fuel. Path $e$ corresponds closely to path $d$. Path $f$ corresponds to path $a$ in that it covers a central core band in three passes; path $f$ has a displaced inlet tube and links 60 fuel tubes of which 59 are charged with fuel. Path $h$ corresponds closely with path $g$ and path $i$ corresponds closely with path $j$. The total number of fuel tubes linked by the ten paths is 800 and of these tubes 790 are charged with fuel.

The arrangement of paths in mutually perpendicular groups of five to form a cross lattice ensures that excess heat produced in the central region of the core with respect to the outer regions is spread over the whole core region as rapidly as possible. The arrangement of the paths so that they link numbers of fuel tubes which do not differ greatly ensures that the pumping requirements to circulate primary coolant through each path do not differ greatly. With the fuel tubes arranged in a square lattice of side 1.529 inches, as previously mentioned, the connections between adjacent tubes are arranged across the diagonals of the square lattice, so that the greater spacing across these diagonals (2.160 inches) can be used to accommodate U bend connectors 48 at the lower ends of the fuel tubes. All the connectors 48 of one group of paths, say a, b, c, d and e, pass below the connectors of the other group of paths and at right angles thereto. All the inlet and outlet connections to the tube assembly are made to the heads of the extension tubes.

What I claim is:

A nuclear reactor comprising elongated fuel element assemblies clustered on respective parallel axes to form a generally cylindrical reactive core configuration, spaced parallel tubes defining channels separately housing the individual fuel element assemblies, first connecting means between neighbouring channel defining tubes to establish a first set of flow paths for causing fluid moderator flowing in the channels to pass sequentially over fuel element assemblies lying on chords of the cylindrical core configuration which chords, for the paths of the first set, are parallel to one another, and second connecting means between other neighbouring channel defining tubes to establish a second set of flow paths for causing fluid moderator flowing in the channels to pass sequentially over fuel element assemblies lying on chords of the cylindrical core configuration, which chords are in parallel relationship but intersect the chords for the first set of paths.

References Cited in the file of this patent

UNITED STATES PATENTS

| | | |
|---|---|---|
| 2,708,656 | Fermi et al. | May 17, 1955 |
| 2,832,733 | Szilard | Apr. 29, 1958 |
| 2,890,158 | Ohlinger et al. | June 9, 1959 |
| 2,958,637 | Voorhees | Nov. 1, 1960 |
| 3,016,738 | Eule | Jan. 16, 1962 |
| 3,053,746 | Challender et al. | Sept. 11, 1962 |
| 3,071,527 | Young | Jan. 1, 1963 |
| 3,105,036 | Puechl | Sept. 24, 1963 |

FOREIGN PATENTS

| | | |
|---|---|---|
| 563,693 | Belgium | Jan. 31, 1958 |
| 799,725 | Great Britain | Aug. 13, 1958 |
| 1,053,109 | Germany | Mar. 19, 1959 |